United States Patent
Hegdal et al.

(10) Patent No.: US 9,823,881 B2
(45) Date of Patent: Nov. 21, 2017

(54) ENSURING STORAGE AVAILABILITY FOR VIRTUAL MACHINES

(71) Applicant: VMware, Inc., Palo Alto, CA (US)

(72) Inventors: Gururaja Hegdal, Bangalore (IN); Kiran Kasala, Bangalore (IN); Marichetty M. S., Bangalore (IN)

(73) Assignee: VMware, Inc., Palo Alto, CA (US)

( * ) Notice: Subject to any disclaimer, the term of this patent is extended or adjusted under 35 U.S.C. 154(b) by 542 days.

(21) Appl. No.: 14/139,005

(22) Filed: Dec. 23, 2013

(65) Prior Publication Data

US 2015/0178019 A1 Jun. 25, 2015

(51) Int. Cl.
| | |
|---|---|
| *G06F 12/00* | (2006.01) |
| *G06F 13/00* | (2006.01) |
| *G06F 3/06* | (2006.01) |
| *G06F 9/455* | (2006.01) |

(52) U.S. Cl.
CPC .......... *G06F 3/0664* (2013.01); *G06F 3/0604* (2013.01); *G06F 3/0629* (2013.01); *G06F 3/0673* (2013.01); *G06F 9/45558* (2013.01); *G06F 2009/45579* (2013.01)

(58) Field of Classification Search
CPC ... G06F 2009/45583; G06F 12/00; G06F 3/06
USPC .......................................................... 711/6
See application file for complete search history.

(56) References Cited

U.S. PATENT DOCUMENTS

| | | | |
|---|---|---|---|
| 7,689,794 B2* | 3/2010 | Allen .................... | G06F 9/544 |
| | | | 711/1 |
| 8,490,092 B2 | 7/2013 | Reuther et al. | |
| 8,745,351 B2* | 6/2014 | Scales .................. | G06F 3/0608 |
| | | | 711/166 |
| 9,378,136 B1* | 6/2016 | Martin ................ | G06F 12/0246 |
| 2005/0108292 A1* | 5/2005 | Burton ................. | G06F 3/0608 |
| 2008/0098154 A1 | 4/2008 | Traut et al. | |
| 2009/0113109 A1 | 4/2009 | Nelson et al. | |

(Continued)

OTHER PUBLICATIONS

Office Action dated Apr. 15, 2015 in counterpart U.S. Appl. No. 14/069,646.

(Continued)

*Primary Examiner* — Sean D. Rossiter
(74) *Attorney, Agent, or Firm* — Patterson & Sheridan LLP (57) ABSTRACT

A management server allocates storage for a virtual disk of a virtual machine configured to execute on a first host computer, where the first host computer is associated with a plurality of data storage devices including first and second data storage devices, and where a first portion of storage is allocated to the virtual disk from the first storage device. The management server receives a request to allocate a second portion of storage to the virtual disk of the virtual machine and, responsive to determining that the first data storage device has insufficient free storage space from which to allocate the second portion of storage, selects the second data storage device having sufficient free storage space from which to allocate the second portion of storage. The management server allocates the second portion of storage for the virtual disk of the virtual machine from the second data storage device, wherein the virtual machine accesses the first and second portions of storage as a single virtual disk.

21 Claims, 7 Drawing Sheets

(56) References Cited

U.S. PATENT DOCUMENTS

| | | | |
|---|---|---|---|
| 2010/0057913 A1* | 3/2010 | DeHaan | G06F 15/173 709/226 |
| 2010/0235669 A1* | 9/2010 | Miyamuko | G06F 9/45558 713/324 |
| 2011/0010515 A1* | 1/2011 | Ranade | G06F 11/1451 711/162 |
| 2011/0131330 A1 | 6/2011 | Beaty et al. | |
| 2011/0145380 A1 | 6/2011 | Glikson et al. | |
| 2011/0161491 A1 | 6/2011 | Sekiguchi | |
| 2011/0191565 A1* | 8/2011 | LeGendre | G06F 12/02 711/171 |
| 2012/0117212 A1 | 5/2012 | Fries | |
| 2012/0278799 A1* | 11/2012 | Starks | G06F 9/455 718/1 |
| 2012/0303858 A1* | 11/2012 | Ginzton | G06F 9/45533 711/6 |
| 2012/0331462 A1 | 12/2012 | Falko | |
| 2013/0073779 A1* | 3/2013 | Prasad | G06F 12/0684 711/6 |
| 2013/0086272 A1 | 4/2013 | Chen et al. | |
| 2013/0138764 A1 | 5/2013 | Satapathy | |
| 2013/0346472 A1 | 12/2013 | Wheeldon | |
| 2014/0196033 A1* | 7/2014 | Bobroff | G06F 9/45558 718/1 |
| 2014/0229936 A1 | 8/2014 | Gaonkar et al. | |
| 2014/0244950 A1 | 8/2014 | Baron et al. | |
| 2015/0074054 A1 | 3/2015 | Antony | |
| 2016/0019159 A1* | 1/2016 | Ueda | G06F 3/06 711/202 |
| 2016/0246628 A1* | 8/2016 | Litke | G06F 9/45558 |
| 2017/0052717 A1* | 2/2017 | Rawat | G06F 3/0619 |

OTHER PUBLICATIONS

A942.01EP—European Search Report—Application No. 14175637, dated May 20, 2016, Consists of 9 Pages.

* cited by examiner

ENSURING STORAGE AVAILABILITY FOR VIRTUAL MACHINES

BACKGROUND

Computer virtualization is a technique that involves encapsulating a physical computing machine platform into a virtual machine that is executed under the control of virtualization software running on a hardware computing platform, or "host." A virtual machine has both virtual system hardware and guest operating system software. Virtual system hardware typically includes at least one "virtual disk," a single file or a set of files that appear as a storage drive to the guest operating system. Virtual disk files are typically stored on a physical storage device or logical storage container (generally referred to as a "datastore"). Virtual machines (or VMs) use the virtual disk in the same manner that a physical storage drive is used, to store the guest operating system, application programs, and application data.

Virtualization software, also referred to as a hypervisor, manages the guest operating system's access to the virtual disk and maps the virtual disk to the underlying physical storage datastore. Datastores may be backed by standalone disk devices, a storage area network (SAN), or network attached storage (NAS), which may contain several physical storage units. Allocating physical storage space for virtual disks corresponding to virtual machines in an organization's data center can stress the physical storage space capacity of the data center. For example, when provisioning a virtual disk for a virtual machine, the virtualization software may allocate all the physical disk space for the virtual disk at the time the virtual disk is initially created. However, such an allocation, referred to as "thick provisioning" may result in storage inefficiencies because the physical storage space allocated for the virtual disk may not be timely used (or ever used) by the virtual machine.

An alternative provisioning method, referred to as "thin provisioning," dynamically allocates physical storage space to a virtual disk only when such physical storage space is needed by the virtual machine and not necessarily when the virtual disk is initially created.

Both thickly and thinly provisioned virtual disks are allocated from storage space of datastores. Because multiple virtual machines (or other applications) demand and compete for storage space on datastores, there is a chance that a particular virtual machine, whether thickly or thinly provisioned, will not have its storage requirements met by the datastore to which it is allocated. For example, if a thinly provisioned virtual machine requests additional virtual disk space and the required amount of physical disk space is not available on the datastore to which the virtual disk is initially allocated, the virtual machine will likely fail or become stopped in a "hung" state. In some cases, a system administrator would need to manually allocate additional storage to the datastore to enable the virtual disk of the virtual machine to "grow," as required. Allocation of additional storage to a datastore may be done through either an "extend" operation or an "extent" operation. An extend operation grows an existing storage "extent" (or partition) of the datastore by allocating additional storage space to the extent out of free storage space that is adjacent to the extent. An extent operation is performed by adding additional extents (or partitions) to the datastore. Once the additional storage is allocated to the datastore on which the virtual disk resides, the size of virtual disk may then be increased.

However, there are situations when all extents of a datastore are fully allocated and no additional extents are available to be allocated to the datastore. Thus, extend and extent operations are precluded. In such a case, the file that implements the virtual disk cannot be extended. Hence the virtual machine runs out of storage and fails.

SUMMARY

An embodiment of the present disclosure provides a method for allocating storage for a virtual disk of a virtual machine configured to execute on a host computer, where the host computer is associated with a plurality of data storage devices including first and second data storage devices, and where a first portion of storage is allocated to the virtual disk from the first storage device. The method includes the steps of receiving a request to allocate a second portion of storage to the virtual disk of the virtual machine and determining that the first data storage device has insufficient free storage space from which to allocate the second portion of storage. The method further includes the step of, in response to the determining, determining that the second data storage device has sufficient free storage space from which to allocate the second portion of storage. The method further includes the step of allocating the second portion of storage for the virtual disk of the virtual machine from the second data storage device, wherein the virtual machine accesses the first and second portions of storage as a single virtual disk.

In another embodiment of the present disclosure, a non-transitory computer readable storage medium stores computer readable program code for allocating storage for a virtual disk of a virtual machine configured to execute on a host computer, where the host computer is associated with a plurality of data storage devices including first and second data storage devices, and where a first portion of storage is allocated to the virtual disk from the first storage device. The computer readable program code includes computer readable program code to receive a request to allocate a second portion of storage to the virtual disk of the virtual machine and computer readable program code to determine that the first data storage device has insufficient free storage space from which to allocate the second portion of storage. The computer readable program code also includes computer readable program code to, in response to the determining, determine that the second data storage device has sufficient free storage space from which to allocate the second portion of storage. The computer readable program code further includes computer readable program code to allocate the second portion of storage for the virtual disk of the virtual machine from the second data storage device, wherein the virtual machine accesses the first and second portions of storage as a single virtual disk.

Another embodiment of the present disclosure provides a virtualized computing system that includes a host computer with a virtual machine executing therein, a plurality of data storage devices including first and second data storage devices that are associated with the host computer, wherein a first portion of storage is allocated to a virtual disk of the virtual machine from the first storage device. The management server is configured to receive a request to allocate a second portion of storage to the virtual disk of the virtual machine and to determine that the first data storage device has insufficient free storage space from which to allocate the second portion of storage. The management server is further configured to, in response to the determining, determine that the second data storage device has sufficient free storage space from which to allocate the second portion of storage. The management server is also configured to allocate the second portion of storage for the virtual disk of the virtual machine from the second data storage device, wherein the virtual machine accesses the first and second portions of storage as a single virtual disk.

DETAILED DESCRIPTION

Figure 1:
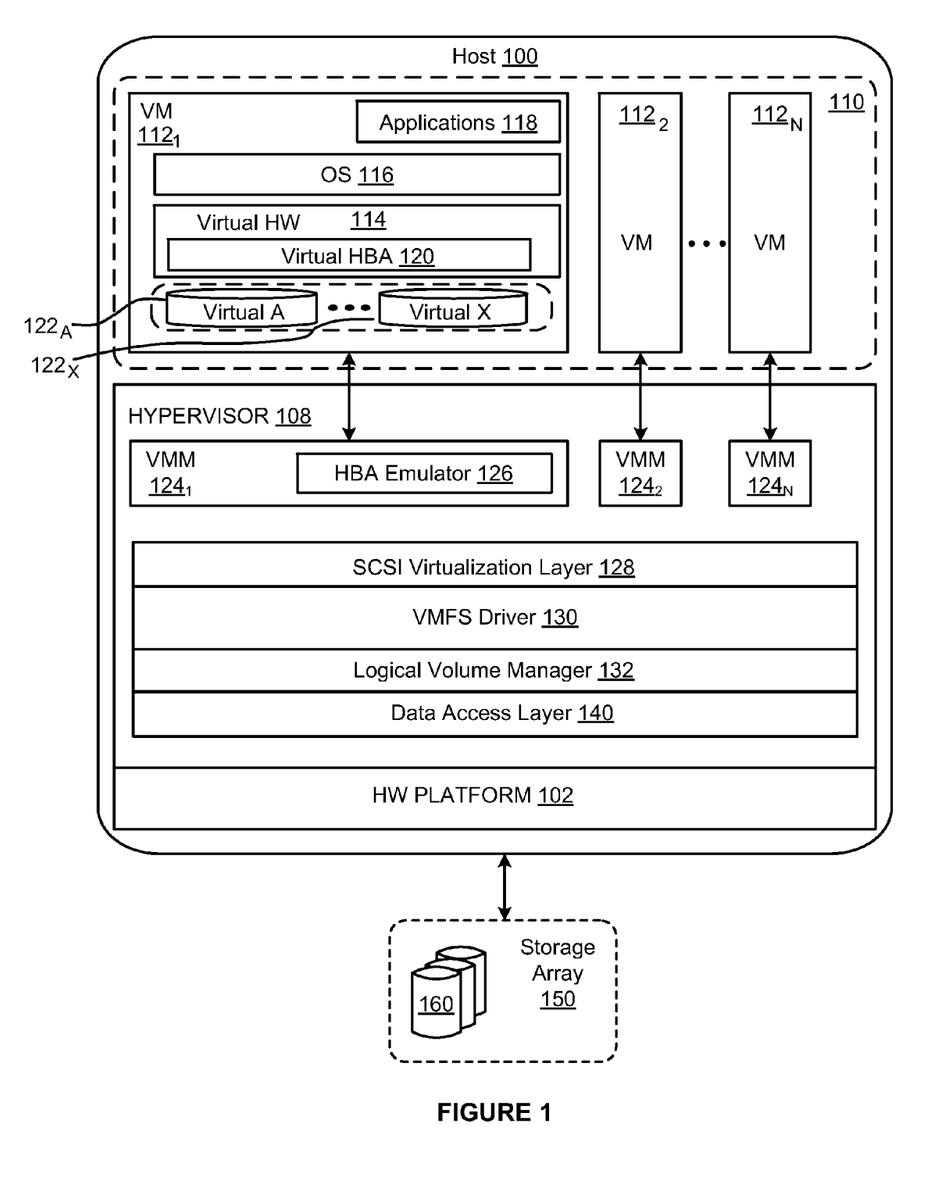
FIG. 1 depicts a block diagram of a host that implements a virtualized computer architecture in which embodiments may be implemented.

FIG. 1 depicts a block diagram of a host 100 that represents a virtualized computer architecture in which embodiments may be implemented. As illustrated, host 100 hosts multiple virtual machines that are run on and share a common physical hardware platform 102. Hardware platform 102 is comprised of, but not limited to, conventional, though typically server-class, computer hardware components, such as one or more central processing units, random access memory, various types of input/output devices, and persistent storage. As further illustrated, hypervisor 108 is installed on top of hardware platform 102. Hypervisor 108 is a virtualization software component that makes possible the concurrent instantiation and execution of one or more virtual machines (VMs) $112_1$-$112_N$ within virtual machine execution space 110. An example of hypervisor 108 is the hypervisor included as a component of VMware's vSphere® product, which is commercially available from VMware, Inc. of Palo Alto, Calif. It should be recognized that other virtualized hypervisors and virtualized computing platforms are within the scope of the present invention.

After instantiation, each VM $112_1$-$112_N$ encapsulates a physical computing machine platform that is executed under the control of hypervisor 108. Each VM $112_1$-$112_N$ implements a virtual hardware platform 114 that supports installation of a guest operating system (OS) 116 which is capable of executing applications 118. Examples of a guest OS 116 include any of the well-known commodity operating systems, such as Microsoft Windows, Linux, and the like. In each instance, guest OS 116 includes a native file system layer (not shown in FIG. 1), for example, an NTFS or an ext3FS type file system. These virtual file system layers interface with their respective virtual hardware platforms 114 to access, from the perspective of guest operating systems 116, a data storage host bus adapter (HBA). This HBA is, in reality, a virtual HBA 120 implemented by virtual hardware platform 114 that provides the appearance of disk storage support (virtual disks $122_A$-$122_X$) to guest OS 116, allowing guest OS 116 to execute seamlessly with the virtualized system hardware. In some embodiments, virtual disks $122_A$-$122_X$ may appear to support, from the perspective of guest OS 116, the SCSI standard for connecting to the virtual machine or any other appropriate hardware connection interface standard known to those with ordinary skill in the art, including IDE, ATA, and ATAPI.

Although, from the perspective of guest operating systems 116, file system calls initiated by such guest operating systems 116 to implement file system-related data transfer and control operations appear to be routed to virtual disks $122_A$-$122_X$ for final execution, in reality, such calls are processed and passed through virtual HBA 120 to virtual machine monitor (VMM) layers $124_1$-$124_N$ that implement the virtual system support needed to coordinate operation with hypervisor 108. In particular, HBA emulator 126 functionally enables the data transfer and control operations to be correctly handled by hypervisor 108 which ultimately passes such operations through its various layers to physical HBAs that connect to a storage array 150, which may be a disk array, an SSD (solid state drive) array, or any mass storage device. As shown in FIG. 1, embodiments of storage array 150 include one or more datastores 160.

Assuming a SCSI supported virtual device implementation (although those with ordinary skill in the art will recognize the option of using other hardware interface standards), SCSI virtualization layer 128 of hypervisor 108 receives a data transfer and control operation (in the form of SCSI commands, for example, intended for a SCSI-compliant virtual disk) from VMM layers $124_1$-$124_N$, and converts them into file system operations that are understood by virtual machine file system (VMFS) driver 130 in order to access a file stored in one of a plurality of logical units (or LUNs) in storage array 150 under the management of VMFS driver 130 that represents the SCSI-compliant virtual disk. In some embodiments, a file that represents each of the virtual disks 122 conforms to the VMware Virtual Disk (vmdk) file format promulgated by VMware, Inc., for virtual disks, although it should be recognized that alternative virtual disk file formats may be used in other embodiments.

SCSI virtualization layer 128 then issues these file system operations to VMFS driver 130. VMFS driver 130 is configured to manage creation, use, and deletion of files (e.g., such as vmdk files representing virtual disks) stored on LUNs exposed by storage array 150. VMFS driver 130 converts the file system operations received from SCSI virtualization layer 128 to volume (e.g. LUN) block operations, and provides the volume block operations to logical volume manager 132. Logical volume manager (LVM) 132 is typically implemented as an intermediate layer between the driver and file system layers, and supports volume oriented virtualization and management of the LUNs accessible through the physical HBAs. LVM 132 issues raw SCSI operations to device access layer 134 based on the LUN block operations. Data access layer 140 includes device access layer 134, which discovers storage array 150, and applies command queuing and scheduling policies to the raw SCSI operations, and device driver 136, which understands the input/output interface of the physical HBAs interfacing with storage array 150, and sends the raw SCSI operations from the device access layer to the physical HBAs to be forwarded to storage array 150.

It should be recognized that the various terms, layers and categorizations used to describe the virtualization components in FIG. 1 may be referred to differently without departing from their functionality or the spirit or scope of the invention. For example, VMMs 124 may be considered separate virtualization components between VMs 112 and hypervisor 108 (which, in such a conception, may itself be considered a virtualization "kernel" component) since there exists a separate VMM for each instantiated VM. Alternatively, each VMM may be considered to be a component of its corresponding virtual machine since such VMM includes the hardware emulation components for the virtual machine. In such an alternative conception, for example, the conceptual layer described as virtual hardware platform 114 may be merged with and into VMM 124 such that virtual host bus adapter 120 is removed from FIG. 1 (i.e., since its functionality is effectuated by host bus adapter emulator 126).

In the embodiments illustrated herein, virtual disks for VM $112_1$-$112_N$ are either thickly provisioned or thinly provisioned. In the case of thick provisioning, storage space is allocated to virtual disks when the virtual disks are created. Thus, with thick provisioning, a virtual disk occupies its entire allocation of datastore storage space upon creation. In the case of thin provisioning, datastore storage space is allocated to virtual disks of VM $112_1$-$112_N$ only as actually used by the virtual disks as the virtual machine executes. For example, a VM 112 may be allocated a virtual disk of size 100 Gigabytes (GB). If the virtual disk is thinly provisioned, then, for example, only a portion of the 100 GB is actually allocated to the virtual disk. If VM 112 having the thinly provisioned virtual disk only requires 50 GB of storage space, then only 50 GB of the 100 GB virtual disk is allocated from datastore space. As VM 112 executes, additional storage space may be required. In such a case, additional storage space is allocated to the virtual disk, up to a maximum allocation of 100 GB.

Figure 2:
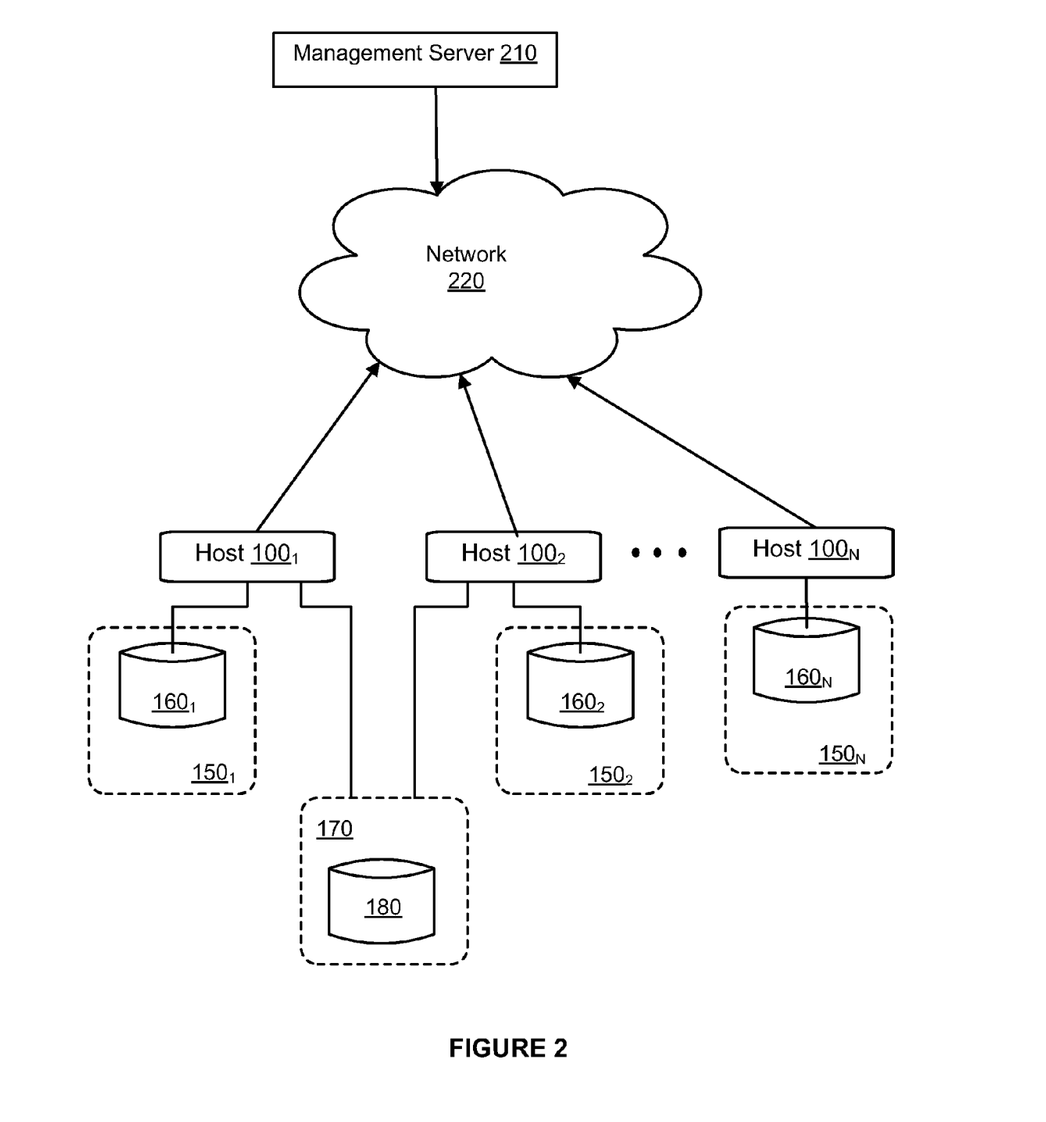
FIG. 2 depicts a plurality of hosts and a management server connected in a network.

FIG. 2 depicts a plurality of hosts $100_{1-N}$ and a management server 210, which are connected to a network 220. Hosts $100_{1-N}$, as well as management server 210, typically comprise server-class computer hardware components and are each capable of implementing a virtualized system architecture. Further, each of hosts $100_{1-N}$ depicted in FIG. 2 is connected to a corresponding storage array $150_{1-N}$, each of which includes one or more datastores 160. Datastores 160 are sometimes referred to as "local" datastores because the datastores (and the storage arrays in which they are contained) are accessible to a single host computer.

In addition, as shown in FIG. 2, host $100_1$ and host $100_2$ are each communicatively connected to shared storage array 170. Shared storage array 170 contains a shared datastore 180, which is accessible to each of hosts $100_1$ and $100_2$. In one or more embodiments, shared storage array 170 may be used to support "high availability" (HA) or "fault tolerant" (FT) virtual machines. Virtual disks of high availability or fault tolerant virtual machines are stored in shared datastores 180, which are accessible to more than one host. The advantage of storing virtual disks on shared datastores is that, in the event a host in which a high availability virtual machine executes fails, the high availability virtual machine may be restarted (or, in the case of a fault tolerant virtual machine, the virtual machine have its processing continued) on another host that is connected to the shared datastore that stores the virtual disks of the virtual machine.

Management server 210 serves as a single point of control for hosts connected to network 220. Management server 210 be a central server, as shown in FIG. 2, or, in other embodiments, management server 210 may execute as a VM in any of hosts $100_{1-N}$. Management server 210 maintains communication with each of hosts $100_{1-N}$, and carries out administrative tasks such as load balancing between hosts and workload balancing between datastores.

Embodiments of hosts 100 monitor virtual machines that execute therein in order to ensure that storage is available to the virtual machines when required. For example, a thinly provisioned virtual machine that requires additional virtual disk storage generates a request for such storage. The request is fulfilled from the datastore on which the virtual disk of the virtual machine is allocated to. That is, the virtual disk is expanded, or "grown," on the datastore to which the virtual disk is allocated. However, if the datastore becomes full (because it is typically shared among many virtual machines and applications), then the virtual machine storage requirement will not be fulfilled. This may result in the failure or a "hung state" of the virtual machine. For mission-critical applications that run in virtual machines, such as file servers, databases, or mail servers, failure of the virtual machine would have a serious impact.

As was previously mentioned, a virtual disk can be expanded (or grown) on a datastore by way of an "extend" operation or an "extent operation." However, this is not always possible. The underlying physical storage devices of the datastore may not have any free extents to add to the datastore. In such a case, management server 210 (along with host 100) proceeds to satisfy the requirement for additional virtual disk space by allocating that space from other datastores that are accessible to the host in which the requesting virtual machine executes.

Embodiments of management server 210 monitor virtual machine storage requests. Other embodiments of management server 210 monitor virtual machine storage utilization. In such embodiments, if a storage of a datastore approaches a certain utilization threshold (for example, 95 percent utilization), then management server 210 may begin monitoring virtual machine storage requests and take appropriate action, along with hosts 100 that host the virtual machines, before the datastore runs out of space, actions such as: expanding or extending the available storage space on the datastore to which the virtual disk is allocated, or, alternatively, using available storage space on other datastores.

Figure 3:
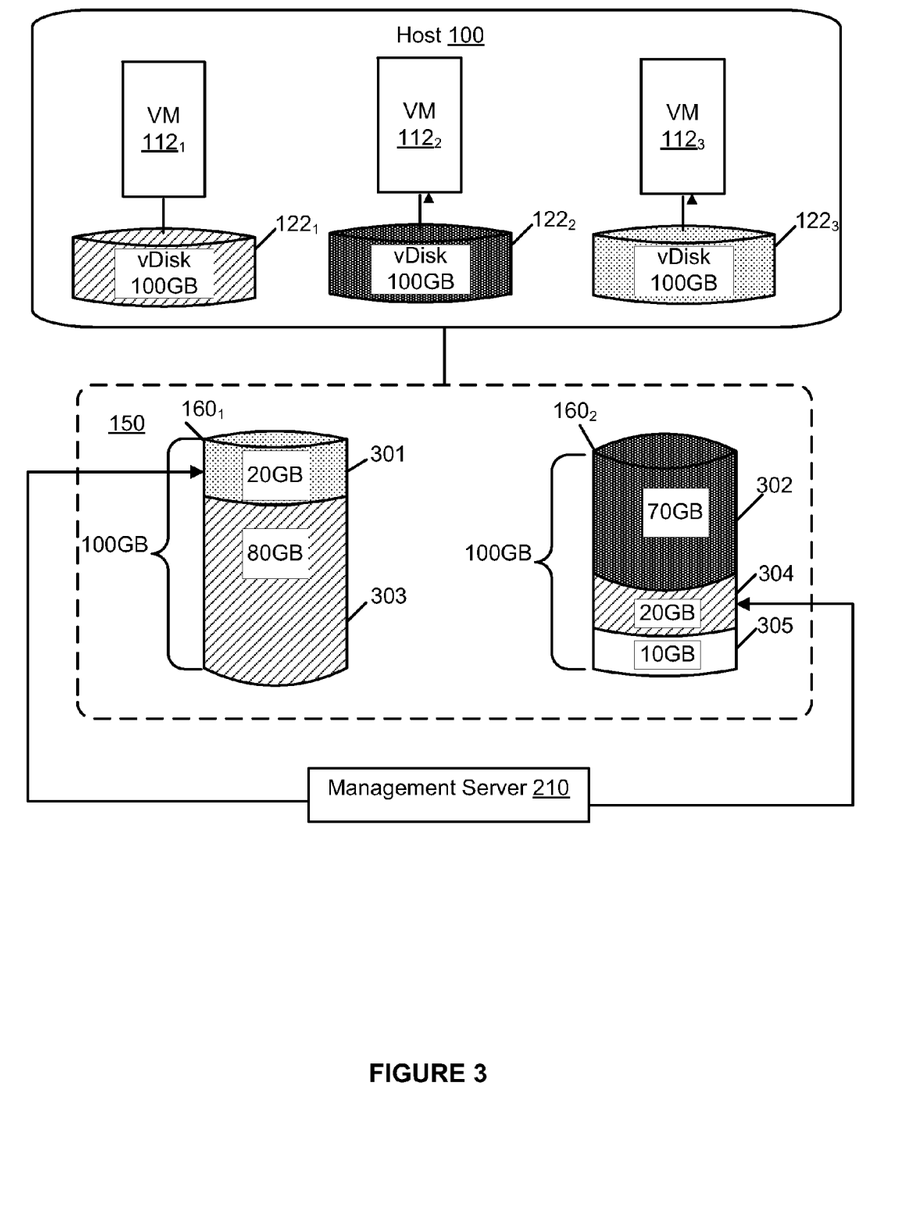
FIG. 3 is a block diagram that illustrates allocation of virtual disk space to a thickly provisioned virtual disk, according to embodiments.

FIG. 3 is a block diagram that illustrates a "thick" provisioning of a virtual disk according to embodiments of the present invention. As previously mentioned, under thick provisioning, a virtual disk of a virtual machine is allocated in a "thick" format, which means that the space provisioned for the virtual disk is fully allocated at the time of creation of the disk. In FIG. 3, management server 210 receives a request to deploy a virtual machine that includes a thickly provisioned virtual disk. In such a case, the request includes a size of the virtual disk to be allocated to a datastore. The requested size of the virtual disk informs management server 210 of how much storage space to allocate on the datastore for the thickly provisioned virtual disk. Alternatively, management server 210 may receive a similar request to thickly provision a virtual disk for a pre-existing virtual machine.

In FIG. 3, VM $112_1$ is being deployed on host 100 and includes a 100 GB virtual disk $122_1$, where virtual disk $122_1$ is allocated in a thick format. In embodiments, virtual disk $122_1$ is a 100 GB vmdk file that is allocated to a datastore 160 in storage array 150. As shown, storage array 150, which is accessible to host 100, contains two datastores $160_1$ and $160_2$. Each of datastores $160_1$ and $160_2$ has a capacity of 100 GB. That is, each datastore may store up to 100 GB of data. In FIG. 3, management server 210 receives a request to thickly provision virtual disk $122_1$ as part of the deployment of VM $112_1$ on host 100. Prior to receiving the request to provision virtual disk $122_1$, datastore $160_1$ has 80 GB of free space and datastore $160_2$ has 30 GB of free space. Because virtual disk $122_1$ has a size of 100 GB, management server 210 determines that 100 GB of contiguous free storage space is not available in either of datastores $160_1$ and $160_2$. This is due to the fact that a thinly provisioned VM $112_3$ has 20 GB allocated to virtual disk $122_3$ at region 301 of datastore $160_1$. Further, thinly provisioned VM $112_2$ has 70 GB allocated to virtual disk $122_2$ at region 302 of datastore $160_2$. These allocations are illustrated by the common patterns depicted for each of VMs $112_2$ and $112_3$ and its corresponding virtual disk $122_2$ and $122_3$. However, the combined free storage space on both datastores is 110 GB (i.e., 80 GB free storage space at region 303 on datastore $160_1$+30 GB free storage space at regions 304 and 305 on datastore $160_2$=110 GB), which is sufficient to support the deployment of 100 GB thickly provisioned virtual disk $122_1$.

Once management server 210 determines that it cannot allocate one contiguous vmdk file for virtual disk $122_1$, management server 210 responds to the determination by beginning to allocate 80 GB free storage space from datastore $160_k$, by creating a first vmdk file and 20 GB free storage space from datastore $160_2$, by creating a second vmdk file. This allocation occurs at region 303 on datastore $160_1$ and at region 304 on datastore $160_2$. Therefore, thickly provisioned virtual disk $122_1$ is allocated from storage space in region 303 on datastore $160_1$ and from storage space in region 304 on datastore $160_2$. Further, in one or more embodiments, the allocation of each region is a separate vmdk file. However, the fact that there are two separate vmdk files allocated each to datastore $160_1$ and $160_2$ is abstracted from VM $112_1$. That is, VM $112_1$ accesses virtual disk $122_1$ as if virtual disk $122_1$ is allocated to a single datastore. Hypervisor 108 manages virtual disk reads and disk writes requested by VM $112_1$ so as to make the existence of two separate vmdk files transparent to VM $112_1$.

Figure 4:
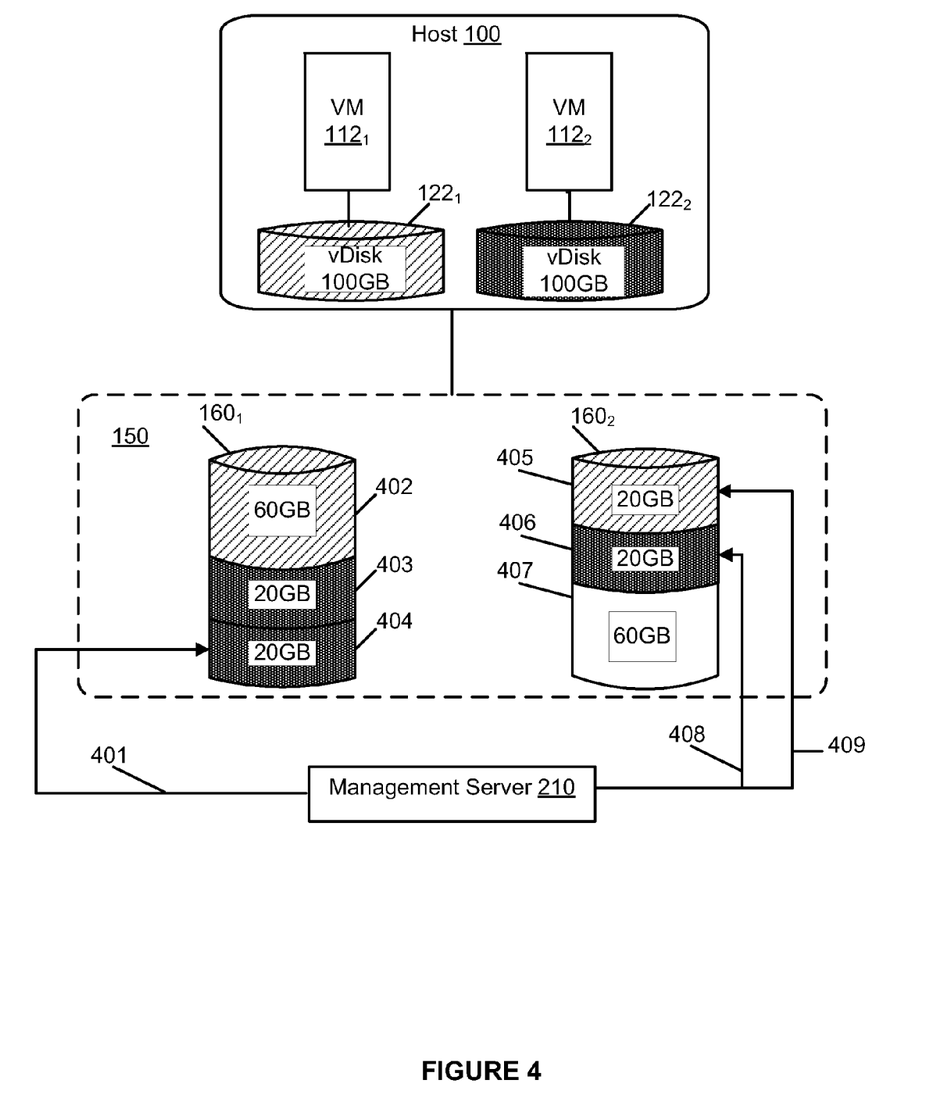
FIG. 4 is a block diagram that illustrates allocation of virtual disk space to a thinly provisioned virtual disk, according to embodiments.

FIG. 4 is a block diagram that illustrates the allocation of "thinly" provisioned virtual disks, according to embodiments of the present invention. For a thinly provisioned virtual disk, management server 210 receives a storage request from a virtual machine for additional storage space for the virtual disk. The request includes a size, which informs management server 210 of how much additional storage space needs to be allocated from a datastore to accommodate the request. In embodiments, management server 210 determines whether the storage request may be satisfied from the datastore from which the thinly provisioned virtual disk has previously been allocated. If management server 210 determines that the storage request cannot be satisfied from the datastore from which the thinly provisioned virtual disk has been previously allocated, management server 210 allocates the additional storage space requested for the virtual disk from other datastores, if possible.

As shown in FIG. 4, host 100 hosts two virtual machines, VM $112_1$ and VM $112_2$. Both VM $112_1$ and VM $112_2$ are "thinly" provisioned virtual machines, which means that storage space for virtual disks for VM $112_1$ and VM $112_2$ are allocated on an as-needed basis. In FIG. 4, VM $112_1$ has a 100 GB thinly provisioned virtual disk $122_1$. Similarly, VM $112_2$ has a 100 GB thinly provisioned virtual disk $122_2$. Virtual disks $122_1$ and $122_2$ are physically allocated from storage array 150, which is accessible to host 100. As shown, storage array 150 contains two datastores, datastore $160_1$ and datastore $160_2$.

In FIG. 4, virtual disk $122_1$ is initially allocated 60 GB of storage on datastore $160_1$. Because virtual disk $122_1$ is a thinly provisioned virtual disk, only an amount of storage required by VM $112_1$ for disk storage is allocated (i.e., 60 GB out of a maximum of 100 GB allocable). The 60 GB of allocated virtual disk storage is denoted in FIG. 4 by region 402 of datastore $160_1$. Similarly, virtual disk $122_2$ is also a thinly provisioned virtual disk. Virtual disk $122_2$ is initially allocated 20 GB (out of a maximum 100 GB allocable). The allocation of 20 GB to virtual disk $122_2$ is shown in FIG. 4 as region 403 on datastore $160_1$. Thus, initially, datastore $160_1$ has 60 GB out of 100 GB of storage allocated to virtual disk $122_1$, and 20 GB out of 100 GB of storage allocated to virtual disk $122_2$. This leaves 20 GB of free storage on datastore $160_k$, which is allocable to either VM $112_1$ or VM $112_2$ or, alternatively, to any other process running on host 100.

Further, because both virtual disks $122_1$ and $122_2$ are thinly provisioned, additional storage may be allocated to these virtual disks as VMs $112_1$ and $112_2$ execute in host 100. For example, as shown by arrow 401 in FIG. 4, management server 210 allocates an additional 20 GB of storage from datastore $160_1$ to VM $112_2$. This allocation of storage may be caused by a number of events. For example, VM $112_2$ may run an application that creates files (such as text documents, spreadsheets, or other types of files). In other cases, VM $112_1$ may run a database application that requires additional disk storage to support an extension of one or more database tables. When more storage is required by a thinly provisioned VM 112, management server 210 determines how much additional storage is required and where that additional storage is allocated from. In FIG. 4, the additional 20 GB of storage is allocated to VM $112_2$ from datastore $160_1$. The region of this allocated storage is depicted as region 404 on datastore $160_1$. Thus, after VM $112_1$ is allocated the additional 20 GB of storage it requires, datastore $160_1$ is completely occupied by virtual disk $122_1$ (which still occupies the 60 GB in region 402), and virtual disk $122_2$ (which occupies the 20 GB of storage in region 403 and 20 GB of storage in region 404). Additionally, storage allocated to virtual disks $122_1$ and $122_2$ are allocated, in embodiments, as vmdk files. Thus, when virtual disk $122_2$ is allocated an additional 20 GB of storage space from an initial allocation of 20 GB, the vmdk file that corresponds to virtual disk $122_2$ is "grown" by an additional 20 GB and, following the allocation, occupies 40 GB of space on datastore $160_1$.

Because datastore $160_1$ has no more free space, additional requests for storage space by either VM $112_1$ or VM $112_2$ (i.e., for virtual disk $122_1$ or virtual disk $122_2$) cannot be satisfied from datastore $160_1$. However, since both virtual disk $122_1$ and virtual disk $122_2$ are thinly provisioned virtual disks, and because neither of the virtual disks has been allocated the maximum allocation (i.e., 100 GB) of disk storage, embodiments of the present invention attempt to allocate additional virtual disk space from other datastores that are accessible to host 100. For example, as shown in FIG. 4, VM $112_1$ requires an additional 20 GB of virtual disk space for virtual disk $122_1$. Management server 210 receives a request for an additional 20 GB virtual disk space to be allocated to VM $112_1$. As mentioned earlier, VM $112_1$ may require additional virtual disk space in order to satisfy guest application or guest operating system storage requirements. As datastore $160_1$ does not have free space, management server 210 satisfies the request from datastore $160_2$, which, initially, has 100 GB of free space. The allocation of storage space to virtual disk $122_1$ is depicted in FIG. 4 by arrow 409.

The additional 20 GB of storage space that is allocated to virtual disk $122_1$ is allocated in region 405 of datastore $160_2$. In one or more embodiments, this additional allocation of storage is embodied as a second vmdk file (where the first vmdk file for virtual disk $122_1$ is allocated in region 402 of datastore $160_1$). Therefore, after the allocation of 20 GB in region 405 of datastore $160_2$, virtual disk $122_1$ is stored as two vmdk files: one on datastore $160_1$ and one on datastore $160_2$. However, VM $112_1$ continues to access virtual disk $122_1$ as if the virtual disk was allocated as a single vmdk. That is, the fact that virtual disk $122_1$ is allocated as two separate vmdk files on two different datastores is transparent to VM $112_1$. Hypervisor 108, which runs on host 100, manages the physical reads and writes from and to virtual disk $122_1$ in order to make this transparency possible.

Further, virtual disk $122_2$ (which is accessed by VM $112_2$) is also a thinly provisioned virtual disk. As was shown previously, virtual disk $122_2$ is allocated 20 GB in region 403 or datastore $160_1$ and 20 GB in region 404 of datastore $160_1$. The second allocation occurs through "growing" (or expanding) the vmdk file corresponding to virtual disk $122_2$ on datastore $160_1$. However, because virtual disk $122_2$ is configured as a 100 GB thinly provisioned virtual disk, virtual disk $122_2$ may be expanded further, up to a maximum of 100 GB. Since datastore $160_1$ contains no more free space, management server 210 allocates additional space to virtual disk $122_2$ from free space on datastore $160_2$. For example, as shown in FIG. 4, VM $112_2$ requires an additional 20 GB of virtual disk space for virtual disk $122_2$, where this additional disk space is required above the additional disk space allocated in region 404 of datastore $160_1$. Therefore, management server 210 allocates the additional 20 GB from region 406 of datastore $160_2$, which is denoted by arrow 408. As is the case for virtual disk $122_1$, the additional space allocated to virtual disk $122_2$ is allocated, in one or more embodiments, as a second vmdk file on datastore $160_2$. Therefore, virtual disk $122_2$ is also stored as two separate vmdk files, specifically, a first vmdk file that occupies regions 403 and 404 on datastore $160_1$, and a second vmdk file that occupies region 406 on datastore $160_2$. With respect to VM $112_2$, as is the case for VM $112_1$, the existence of two separate vmdk files for virtual disk $122_2$ is transparent to VM $112_2$. That is, hypervisor 108 manages to physical reads and writes from and to virtual disk $122_2$ in such a way as to cause virtual disk $122_2$ to appear to VM $112_2$ as a single contiguous virtual disk allocated on a single datastore.

Figure 5:
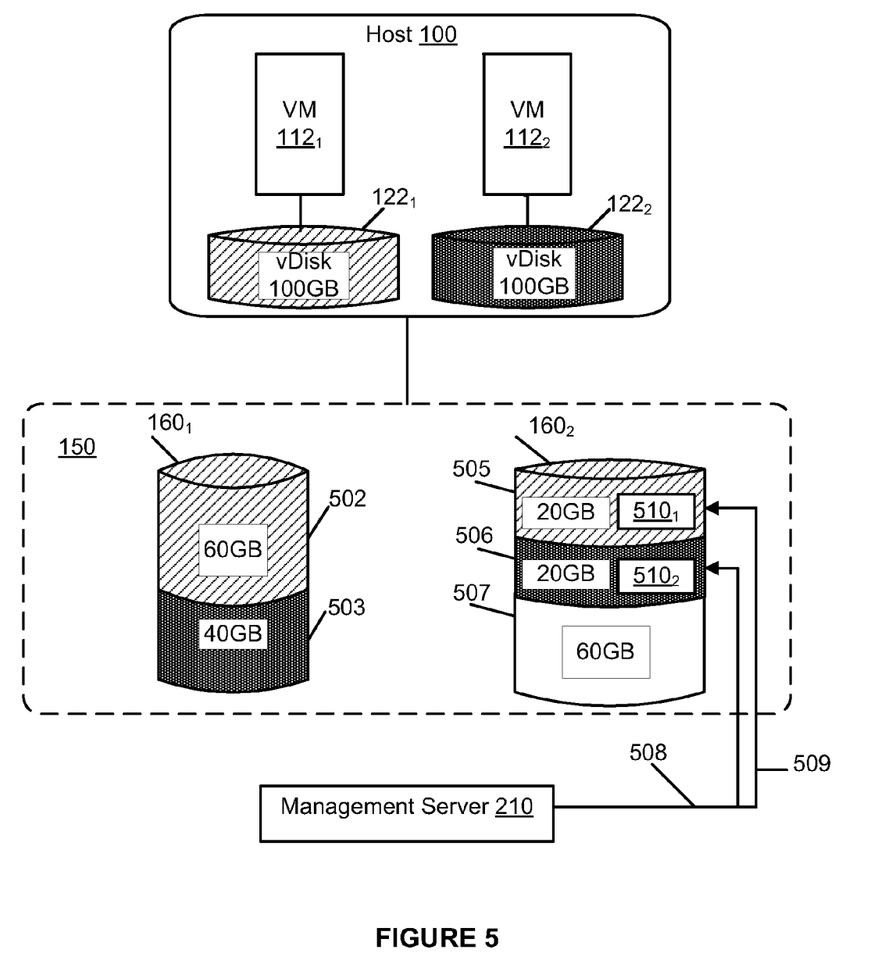
FIG. 5 is a block diagram that depicts allocation of disk space to virtual machine snapshots, according to embodiments.

FIG. 5 is a block diagram that depicts the allocation of snapshots to virtual machines, according to embodiments of the present invention. As is the case for FIG. 4, FIG. 5 depicts a host 100 that hosts two virtual machines, VM $112_1$ and VM $112_2$. Host 100 is accesses storage array 150, which contains two datastores $160_1$ and $160_2$. Each of datastores $160_1$ and $160_2$ has a capacity of 100 GB. Both virtual machines $112_1$ and $112_2$ are configured to include 100 GB virtual disks, virtual disk $122_1$ and $122_2$, respectively. As was the case in the example depicted in FIG. 4, virtual disks $122_1$ and $122_2$ are thinly provisioned virtual disks. As shown, initially, virtual disk $122_1$ has 60 GB, out of a maximum of 100 GB allocable, allocated to region 502 of datastore $160_1$. Further, virtual disk $122_2$ has 40 GB, out of a maximum of 100 GB allocable, allocated to region 503 of datastore $160_1$.

One or more embodiments of the present invention support virtual machine snapshots. A snapshot of a virtual machine preserves both the execution state and the data of the virtual machine at some specific point in time. The state of the virtual machine includes, for example, the power state of the virtual machine (i.e., whether the virtual machine is powered on, powered off, or suspended). Another example of the state of a virtual machine is the memory state of the virtual machine (i.e., the contents of the virtual memory of the virtual machine). Yet another example of the state of the virtual machine is the state of all virtual devices (such as virtual printers, network interface cards, and the like) of the virtual machine.

In one or more embodiments, snapshots comprise a collection of files that correspond to the various aspects of the state of a virtual machine. For example, in some embodiments, one or more "delta" vmdk files for a virtual disk of a virtual machine is associated with the virtual machine at the time a snapshot is taken. The delta vmdk files exist in addition to a corresponding "base" vmdk file, which is the vmdk file that was used by the virtual machine prior to the time of the snapshot. Delta vmdk files may be referred to as child virtual disks of a given base vmdk file (which represents a base virtual disk or "parent" virtual disk). With virtual machine snapshots, each child virtual disk (which is created when a snapshot is taken), may be used in conjunction with other child virtual disks previously created from prior snapshots, as well as with the original "base" virtual disk, in order to derive the current state of the virtual disk.

For example, a virtual disk may be allocated as a base virtual disk, and written to up until a first snapshot time. At the first snapshot time, a snapshot of the base virtual disk is taken, thereby creating a child virtual disk. After the time of the snapshot, further changes to the virtual disk are captured in the child virtual disk, rather than in the base virtual disk. Thus, the current overall state of the virtual disk is derived by using the child virtual disk in combination with the base virtual disk.

As shown, creating a snapshot of a virtual machine entails the creation of additional files (e.g., child virtual disk files, as well as other files that comprise the state of a virtual machine). The taking of a virtual machine snapshot, in some respects, is similar to the expansion of a thinly provisioned virtual disk. The child disks are allocated to the virtual machine in much the same way that additional virtual disk space is allocated to a thinly provisioned virtual machine. Referring to FIG. 5, a snapshot of VM $112_1$ is taken. However, as shown, datastore $160_1$ does not have any free space in which to allocate child virtual disks and other files created as a result of the snapshot. Therefore, management server 210 allocates files created as a result of the snapshot on datastore $160_2$, which, initially, has 100 GB of free space. The allocation of snapshot files (e.g., child virtual disks) to VM $112_1$ is depicted by arrow 509. Management server 210 determines that 20 GB of storage space is required to successfully complete a snapshot operation. Therefore, snapshot files are allocated in 20 GB region 505 of datastore $160_2$. The snapshot files and data are denoted as $510_1$, which corresponds to VM $112_1$. Therefore, after the snapshot is taken, the current state of VM $112_1$ may be derived by using the snapshot files allocated in region 505 of datastore $160_2$ in conjunction with the "base" virtual disk of VM $112_1$, which is allocated in the 60 GB region of datastore $160_1$. Additionally, the fact that snapshot data $510_1$ is allocated to datastore $160_2$, while base virtual disk $122_1$ is allocated to datastore $160_k$, is transparent to VM $112_1$.

Similarly, a snapshot is also taken of VM $112_2$. As no more free space is allocable on datastore $160_1$, the snapshot files are allocated and stored to datastore $160_2$, which, after the snapshot taken for VM $112_1$, has 80 GB of free space (i.e., 100 GB capacity–20 GB allocated to snapshot files for VM $112_1$=80 GB of free space). The allocation of the snapshot files for VM $112_2$ is depicted by arrow 508. The snapshot files for VM $112_2$ are denoted as $510_2$, and are stored in the 20 GB region 506 of datastore $160_2$. Therefore, after the snapshot of VM $112_2$ is taken, the current state of VM $112_2$ may be derived by using the snapshot files allocated in region 506 of datastore $160_2$ in conjunction with the "base" virtual disk of VM $112_2$, which is allocated in the 40 GB region of datastore $160_1$. Additionally, the fact that snapshot data $510_2$ is allocated to datastore $160_2$, while base virtual disk $122_2$ is allocated to datastore $160_k$, is transparent to VM $112_2$.

In some virtualized computing environments, virtual machines that perform certain mission-critical functions require a high level of availability. For example, an airline may require 24 hour/7-day per week availability of its reservation system. Should the reservation system fail for some reason, it is desirable for the system to have built-in redundancies to enable recovery. Since applications, including mission-critical applications, are increasingly run in virtualized computing platforms, high availability of virtual machines has become a priority. Accordingly, a number of commercial products have been developed to meet this requirement. One example is VMware High Availability ("HA"), which is available from VMware, Inc. VMware HA addresses server failures by automatically restarting virtual machines on alternate servers. In the case of operating system failure, VMware HA automatically restarts the failed virtual machine on the same physical server. Other products go even further and support almost continuous availability of virtual machines. For example, VMware Fault Tolerance (FT) supports high availability virtualized computing, whereby the downtime of a failed virtual machine is kept to a minimum. With VMware FT, a live "shadow" instance of a primary virtual machine is created, where the shadow runs on a different physical server. The primary and shadow virtual machines are kept in virtual lockstep with each other, which enables the shadow virtual machine to quickly replace the primary virtual machine if the primary virtual machine fails.

Both VMware HA and VMware FT (as well as other high-availability solutions) leverage shared storage to enable alternative hosts to access a failed virtual machine in order to continue execution of the failed virtual machine. Indeed, failover to an alternative host is not possible unless a primary host and an alternate host have access to the same virtual machine files (i.e., the same virtual machine configuration files and virtual disks).

Virtual machines that execute in virtualized environments that support high-availability are provisioned similarly as virtual machines in other virtualized environments. That is, such high-availability virtual machines are either provisioned thickly or thinly. Therefore, high-availability virtual machines have similar storage constraint issues as non-high-availability virtual machines. For example, if a thinly provisioned high-availability virtual machine requires additional virtual disk space during execution, the extra virtual disk space will be provided by extending the vmdk file corresponding to the virtual disk on the same datastore on which the vmdk file is allocated. However, as shown earlier, when insufficient free space is available on the same datastore, embodiments of management server 210 allocates one or more additional vmdk files to other datastores that are available to the host computer on which the virtual machine executes. In the case of high-availability, or fault-tolerant, virtual machines, the allocation of additional virtual disk space occurs on datastores that are shared with other hosts configured to support a failover operation of the virtual machine. As explained above, such a shared storage configuration is required in order for an alternate host computer to begin properly resume execution of a virtual machine that has failed or for a virtual machine whose host computer has failed.

Figure 6:
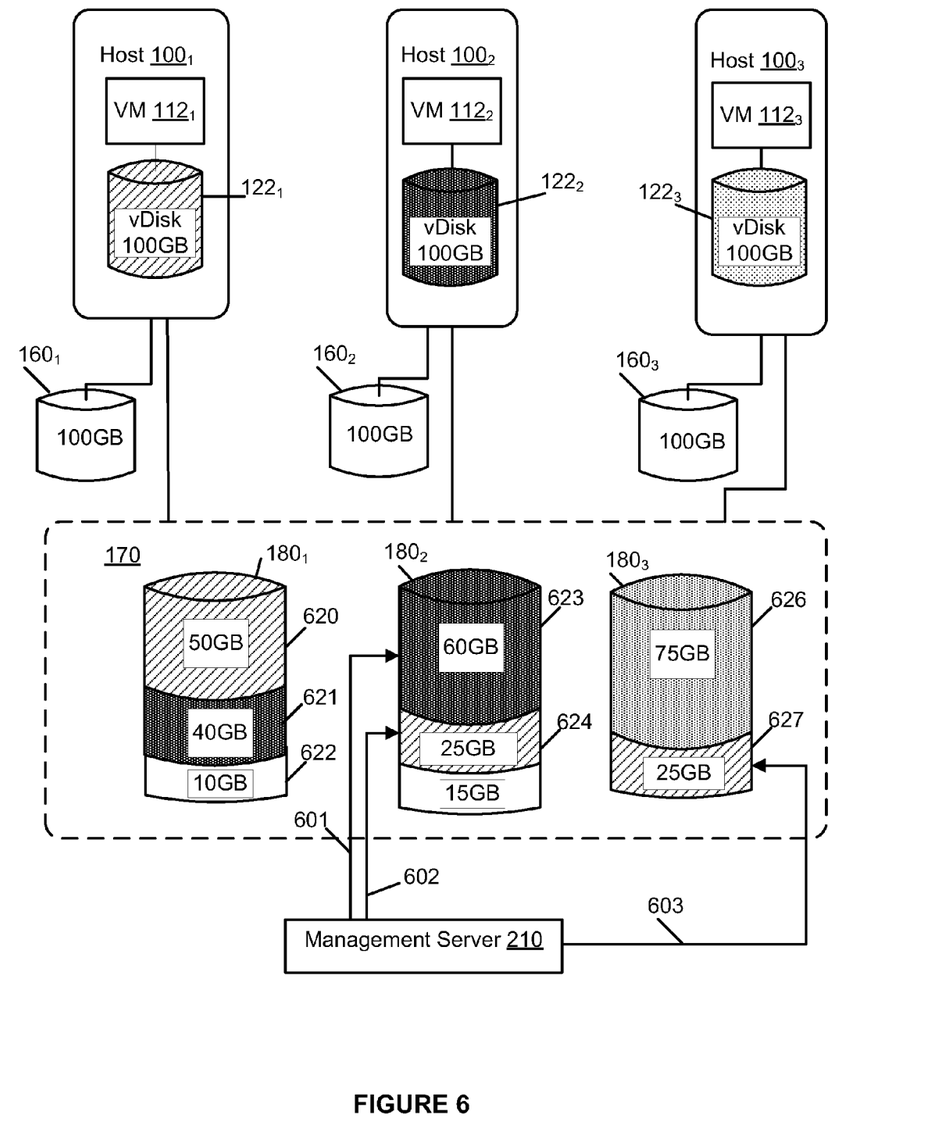
FIG. 6 is a block diagram that illustrates allocation of virtual disk storage to high-availability virtual machines, according to embodiments.

FIG. 6 is a block diagram that illustrates the allocation of virtual disk storage to high-availability virtual machines, according to embodiments of the present invention. As shown, hosts $100_1$, $100_2$, and $100_3$ are each connected to a shared storage array 170. A shared storage array comprises a group of datastores that are accessible to more than one host computer. By contrast, a local storage array is comprised of datastores that are accessible to one host computer. Hosts $100_1$, $100_2$, and $100_3$ are configured to form a high-availability (or fault-tolerant) cluster, which means that virtual machines that run on any one of hosts $100_1$, $100_2$, or $100_3$ may run on any other host in the cluster should any of the virtual machines fail.

Shared storage array 170 contains three datastores $180_1$, $180_2$, and $180_3$. Each of datastores $180_1$, $180_2$, and $180_3$ has a capacity of 100 GB. In addition each of hosts $100_1$, $100_2$, and $100_3$ accesses a local datastore $160_k$, $160_2$, and $160_3$, respectively. Each of datastores $160_k$, $160_2$, and $160_3$ has a storage capacity of 100 GB. Further, hosts $100_1$, $100_2$, and $100_3$ each has a virtual machine VM $112_1$, $112_2$, and $112_3$ executing therein. VMs $112_1$ and $112_2$ are thinly provisioned virtual machines with virtual disks $122_1$ and $122_2$ configured to store 100 GB of data. VM $112_3$ also has a thinly provisioned virtual disk $122_3$ configured to store 100 GB of data. Additionally, VM $112_1$, VM $112_2$, and VM $112_3$ are high-availability (or fault-tolerant) virtual machines. High-availability (or fault-tolerant) virtual machines are virtual machines that execute on a first host computer and, in case of failure, may be restarted (or continue executing) on a second host computer. In order for the first and second host computers to have the capability to execute the high-availability (fault-tolerant) virtual machine, both host computers access the virtual disks of the virtual machine in a shared storage array (or, in embodiments, a shared datastore). Thus, virtual disks of VMs $112_{1-3}$ are allocated on shared datastores contained in shared storage array 170.

Referring to FIG. 6, virtual disk $122_1$ is initially allocated 50 GB (out of a maximum of 100 GB configured) to region 620 on shared datastore $180_1$. Further, virtual disk $122_2$ has 40 GB allocated initially to region 621 on shared datastore $180_1$. Thus, initially, shared datastore $180_1$ has 10 GB of free space, which is denoted by region 622. Further, shared datastore $180_2$ initially has 100 GB of free storage. In addition, shared datastore $180_3$ initially has 75 GB allocated to virtual disk $122_3$ in region 626, and has free space of 25 GB in region 627.

Because virtual disk $122_2$ is thinly provisioned, VM $112_2$ may generate a request for additional virtual disk space as VM $112_2$ executes. As shown in FIG. 6, VM $112_2$ requests an additional 60 GB of virtual disk space for virtual disk $122_2$. Because 60 GB of virtual disk space cannot be allocated to datastore $180_k$, management server 210 allocates 60 GB to virtual disk $122_2$ in region 623 of datastore $180_2$. The allocation is denoted by arrow 601. Note that 100 GB of free storage is available from local datastore $160_2$, which is connected only to host $100_2$. However, because VM $112_2$ is a high-availability (or fault-tolerant) virtual machine, the allocation of additional virtual disk space must be to a shared datastore. In this case, datastore $180_2$ has sufficient free storage and the allocation is made to region 623. Once management server 210 allocates 60 GB to virtual machine $122_2$ in region 623, datastore $180_2$ has free storage space of 40 GB (i.e., 100 GB capacity−60 GB allocation=40 GB). In addition, as is the case for non-high-availability virtual machines, VM $112_2$ has two vmdk files allocated: a 40 GB vmdk file allocated on shared datastore $180_1$ and a 60 GB vmdk file allocated on shared datastore $180_2$. As was mentioned earlier, the fact that two separate vmdk files are allocated on separate shared datastores is transparent to VM $112_2$.

Further, as VM $112_1$ executes, virtual disk space is requested for virtual disk $122_1$. For example, as shown in FIG. 6, a request for an additional 50 GB of virtual disk space for virtual disk $122_1$ is generated by VM $112_1$. The 50 GB of additional virtual disk space cannot be satisfied from any of shared datastores $180_1$, $180_2$, or $180_3$. Prior to the request for additional virtual disk space for virtual disk $122_1$, shared datastore $180_1$ has 10 GB of free space, shared datastore $180_2$ has 40 GB of free space, and shared datastore $180_3$ has 25 GB of free space. Therefore, management server 210 satisfies the request for additional virtual disk space by allocating 25 GB to region 624 of shared datastore $180_2$ and by allocating 25 GB to region 627 of shared datastore $180_3$. The allocations are denoted by arrows 602 and 603, respectively. Note that local datastore $160_1$, which is connected only to host $100_1$, has 100 GB of free storage and could potentially satisfy the request for 50 GB of additional virtual disk space. However, because VM $112_1$ is a high-availability (or fault-tolerant) virtual machine, the request must be satisfied from a datastore that is shared by all hosts in the high-availability cluster. Thus, once allocations 602 and 603 are complete, shared datastore $180_1$ has 15 GB of free space and shared datastore $180_3$ has no free space. Note that, in embodiments, allocations to shared datastores 180 may be done in any combination, so long as the requisite amount of storage is available. Further, note that, after storage allocations 602 and 603 are complete, virtual disk $122_1$ comprises three vmdk files: a 50 GB vmdk file on shared datastore $180_1$, a 25 GB vmdk file on shared datastore $180_2$, and a 25 GB vmdk file on shared datastore $180_3$. As was mentioned before, these three vmdk files are accessed transparently by VM $112_1$. That is, the three vmdk files appear to VM $112_1$ as a single contiguous virtual disk.

Figure 7:
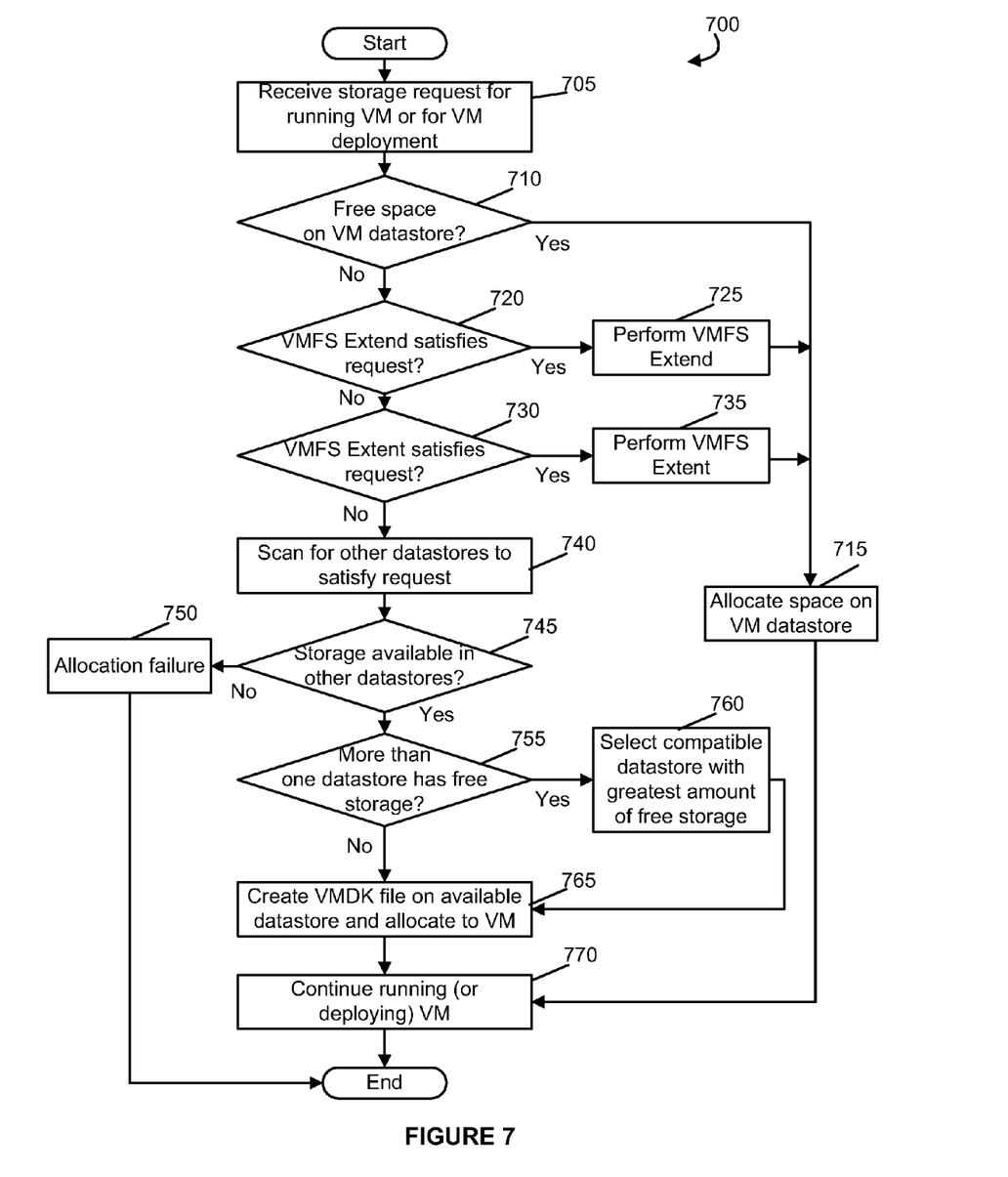
FIG. 7 is a flow diagram that depicts a method executed by a management server, to allocate virtual disk storage to a virtual machine during a deployment of the virtual machine, or, alternatively, during execution of the virtual machine, according to embodiments.

FIG. 7 is a flow diagram that depicts a method 700 executed by management server 210, where virtual disk storage is allocated to a virtual machine either during a deployment of the virtual machine, or, alternatively, during execution of the virtual machine, according to one or more embodiments. The method begins at step 705, where management server 210 receives a request for storage for an executing virtual machine or for a virtual machine that is being deployed. At step 710, management server determines whether there exists enough free space on the datastore to which the virtual disk of the virtual machine has been allocated, or whether the datastore utilization exceeds a configured threshold limit. For example, in case of a thinly provisioned virtual machine that is executing, the virtual machine may have a virtual disk already allocated on a datastore when the request for additional space is received. Management server 210 determines whether the datastore can accommodate the storage request. If management server 210 determines that the datastore can accommodate the storage request (i.e., the datastore utilization does not exceed the configured threshold limit), then, at step 715, management server 210 allocates space on the datastore and then proceeds to step 770 to continue running (or deploying) the virtual machine.

If, at step 710, management server 210 determines that there is not enough free space allocable on the datastore to satisfy the storage request, or, alternatively, that the datastore utilization exceeds a configured threshold limit, management server 210 proceeds to step 720. At step 720, management server determines whether a VMFS extend operation can be performed to satisfy the request. In some embodiments, a VMFS extend operation involves extending an existing VMFS datastore so that the datastore uses available adjacent capacity. In embodiments, a VMFS datastore serves as a repository for virtual machines and virtual disks. VMFS datastores comprise extents (or partitions) of a storage device. If free storage space on a storage device is adjacent to an extent of a VMFS datastore, then the VMFS datastore may be extended, through a VMFS extend operation, to use some or all of the free adjacent storage space. If, at step 720, management server 210 determines that a VMFS extend operation may be performed, then management server 210 performs the VMFS extend operation at step 725 and allocates the requested virtual disk space at step 715. After allocating the request virtual disk storage, management server 210 then proceeds to step 770 to continue executing (or deploying) the virtual machine.

However, if, at step 720, management server 210 determines that a VMFS extend on the datastore to which the virtual disk has been allocated is not possible, then management server proceeds to step 730. At step 730, management server 210 determines whether a VMFS extent operation may be performed. An extent operation involves dynamically adding a new partition to a datastore or LUN. In embodiments, up to 32 new extents of the same storage type may be added to an existing VMFS datastore. If a VMFS extent operation can be performed, then, at step 735, management server 210 performs the VMFS extent and at step 715 allocates the requested virtual disk space from the added extent. After allocating the requested virtual disk storage, management server 210 then proceeds to step 770 to continue executing (or deploying) the virtual machine.

If, however, management server 210 determines that a VMFS extent operation may not be performed on the datastore, then management server 210 proceeds to step 740, where management server 210 scans for other potential datastores that may satisfy the request for storage. At step 745, management server 210 determines whether storage that may satisfy the storage request is available in another datastore. If management server 210 determines that no accessible datastore has free space sufficient to satisfy the storage request, then management server proceeds to step 750 to indicate an allocation failure and perform any recovery operations that are necessary. After step 750, method 700 proceeds to terminate.

If management server 210 determines at step 745 that at least one datastore may satisfy the storage request, then management server proceeds to step 755 to determine whether multiple datastores may satisfy the storage request. If multiple datastores capable of satisfying the storage request exist, then management server 210 proceeds to step 760. At step 760, a compatible datastore is selected, where the compatible datastore has the greatest amount of free storage. Selecting a compatible datastore entails, in some embodiments, selecting a shared datastore in cases where the virtual machine that requires storage is a high-availability/fault-tolerant virtual machine. Selecting a datastore with the greatest amount of free storage is beneficial because it minimizes the number of vmdks allocated and, therefore, minimizes the number of vmdks that need to be managed. In other embodiments, a compatible datastore is selected at step 760 based on other factors such as, but not limited to, the number of accesses made to the datastore, the degree of fragmentation of the datastore, and other performance metrics of storage devices.

At step 765, a vmdk file is created on the selected (or, as the case may be, the only) available datastore. As previously mentioned, the creation of the vmdk is transparent to the requesting virtual machine, which sees the newly created vmdk, along with one or more vmdks previously allocated to the virtual disk, as one contiguous virtual disk.

Once a vmdk file is allocated at step 765, the requesting virtual machine continues to run with the newly allocated vmdk file at step 770. Alternatively, in case the requesting virtual machine is being deployed, then deployment of the virtual machine continues at step 770. Further, the requesting virtual machine accesses the newly allocated vmdk file, along with any previously allocated vmdk files, as if the vmdk files comprised a single virtual disk. After step 770, method 700 terminates.

Although one or more embodiments have been described herein in some detail for clarity of understanding, it should be recognized that certain changes and modifications may be made without departing from the spirit of the disclosure. For example, in one or more embodiments, management server 210 consolidates virtual disk space that it has allocated and, upon request, generates a report to an administrator on the allocation of virtual disks on one or more datastores. For example, referring to FIG. 4, after management server 210 allocates 20 GB of additional virtual disk storage for virtual disk $122_1$ to datastore $160_2$, one or more embodiments determines that 20 GB or more of storage has been freed on datastore $160_1$. In such case, embodiments of management server 210 migrate (i.e., copy and consolidate) the 20 GB of storage allocated on datastore $160_2$ to 20 GB of storage allocated on datastore $160_1$. Therefore, virtual disk $122_1$ would only require a single vmdk files (allocated to datastore $160_1$), rather than two vmdk files allocated to both datastore $160_1$ and $160_2$. This embodiment has the benefit of eliminating any overhead involved with maintaining two separate vmdk files.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, yielding, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Many variations, modifications, additions, and improvements are possible. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for allocating storage provisioned from first and second data storage devices for a virtual disk of a virtual machine configured to execute on a first host computer, where the first host computer is associated with a plurality of data storage devices including the first and second data storage devices, and where a first portion of the storage is allocated to the virtual disk from the first storage device, the method comprising:

receiving a request to allocate a second portion of the storage to the virtual disk of the virtual machine;

responsive to determining that the first data storage device has insufficient free storage space from which to allocate the second portion of the storage, selecting the second data storage device having sufficient free storage space from which to allocate the second portion of the storage; and allocating the second portion of the storage for the virtual disk of the virtual machine from the second data storage device, wherein the first portion is allocated as a first virtual disk file and the second portion is allocated as a second virtual disk file, and wherein the virtual machine accesses the first and second portions of the storage as a single virtual disk.

2. The method of claim 1, further comprising:
scanning the plurality of data storage devices for a data storage device with sufficient free storage space from which to allocate the second portion of the storage.

3. The method of claim 2, further comprising:
responsive to determining that more than one data storage device has sufficient free storage space from which to allocate the second portion of the storage, selecting one of the plurality of data storage devices as the second data storage device, wherein the selected data storage device has a greatest amount of free storage space compared with each of the other data storage devices in the plurality of data storage devices.

4. The method of claim 2, further comprising:
determining that the virtual machine is a high availability virtual machine, wherein the virtual machine is configured to execute on a second host computer if execution of the virtual machine terminates on the first host computer; and
selecting one of the plurality of storage devices as the second storage device, wherein the selected storage device is accessible to the first host computer and to the second host computer.

5. The method of claim 1, wherein determining that the first data storage device has insufficient free storage space comprises:
performing a method to extend a storage space of the first data storage device; and
detecting that the method to extend the storage space of the first data storage device has failed.

6. The method of claim 1, wherein determining that the first data storage device has insufficient free storage space comprises:
performing a method to add one or more extents to the first data storage device; and
detecting that the method to add one or more extents to the first data storage device has failed.

7. The method of claim 1, further comprising:
after allocating the second portion of the storage to the second data storage device, determining that the first storage device has sufficient free space to store the second portion of the storage; and
migrating the second portion of the storage from the second storage device to the first storage device.

8. A non-transitory computer readable storage medium having stored thereon computer readable program code for allocating storage provisioned from first and second data storage devices for a virtual disk of a virtual machine configured to execute on a first host computer, where the first host computer is associated with a plurality of data storage devices including the first and second data storage devices, and where a first portion of the storage is allocated to the virtual disk from the first storage device,
the computer readable program code comprising:
computer readable program code to receive a request to allocate a second portion of the storage to the virtual disk of the virtual machine;
computer readable program code to, in response to determining that the first data storage device has insufficient free storage space from which to allocate the second portion of the storage, select the second data storage device having sufficient free storage space from which to allocate the second portion of the storage; and
computer readable program code to allocate the second portion of the storage for the virtual disk of the virtual machine from the second data storage device, wherein the first portion is allocated as a first virtual disk file and the second portion is allocated as a second virtual disk file and, wherein the virtual machine accesses the first and second portions of the storage as a single virtual disk.

9. The computer readable storage medium of claim 8, the computer readable program code further comprising:
computer readable program code to scan the plurality of data storage devices for a data storage device with sufficient free storage space from which to allocate the second portion of the storage.

10. The computer readable storage medium of claim 9, the computer readable program code further comprising:
computer readable program code to, in response to determining that more than one data storage device has sufficient free storage space from which to allocate the second portion of the storage, select one of the plurality of data storage devices as the second data storage device, wherein the selected data storage device has a greatest amount of free storage space compared with each of the other data storage devices in the plurality of data storage devices.

11. The computer readable storage medium of claim 9, the computer readable program code further comprising:
computer readable program code to determine that the virtual machine is a high availability virtual machine, wherein the virtual machine is configured to execute on a second host computer if execution of the virtual machine terminates on the first host computer; and
computer readable program code to select one of the plurality of storage devices as the second storage device, wherein the selected storage device is accessible to the first host computer and to the second host computer.

12. The computer readable storage medium of claim 8, wherein the computer readable program code to determine that the first data storage device has insufficient free storage space comprises:
computer readable program code to perform a method to extend a storage space of the first data storage device; and
computer readable program code to detect that the method to extend the storage space of the first data storage device has failed.

13. The computer readable storage medium of claim 8, wherein the computer readable program code to determine that the first data storage device has insufficient free storage space comprises:
computer readable program code to perform a method to add one or more storage extents to the first data storage device; and
computer readable program code to detect that the method to add one or more storage extents to the first data storage device has failed.

14. The computer readable storage medium of claim 8, the computer readable program code further comprising:
computer readable program code to determine, after allocating the second portion of the storage to the second data storage device, that the first storage device has sufficient free space to store the second portion of the storage; and computer readable program code to migrate the second portion of the storage from the second storage device to the first storage device.

15. A virtualized computing system, comprising:
a first host computer with a virtual machine executing therein;
a plurality of data storage devices including first and second data storage devices that are associated with the first host computer; and
a management server configured to allocate storage provisioned from the first and second data storage devices for a virtual disk of the virtual machine, wherein a first portion of the storage is allocated to the virtual disk from the first storage device and the management server is configured to:
receive a request to allocate a second portion of the storage to the virtual disk of the virtual machine;
in response to determining that the first data storage device has insufficient free storage space from which to allocate the second portion of the storage, select the second data storage device having sufficient free storage space from which to allocate the second portion of the storage; and
allocate the second portion of the storage for the virtual disk of the virtual machine from the second data storage device, wherein the first portion is allocated as a first virtual disk file and the second portion is allocated as a second virtual disk file, and wherein the virtual machine accesses the first and second portions of the storage as a single virtual disk.

16. The system of claim 15, wherein the management server is further configured to scan the plurality of data storage devices for a data storage device with sufficient free storage space from which to allocate the second portion of the storage.

17. The system of claim 16, wherein the management server is further configured to: in response to determining that more than one data storage device has sufficient free storage space from which to allocate the second portion of the storage, select one of the plurality of data storage devices as the second data storage device, wherein the selected data storage device has a greatest amount of free storage space compared with each of the other data storage devices in the plurality of data storage devices.

18. The system of claim 16, wherein the management server is further configured to:
determine that the virtual machine is a high availability virtual machine, wherein the virtual machine is configured to execute on a second host computer if execution of the virtual machine terminates on the first host computer; and
select one of the plurality of storage devices as the second storage device, wherein the selected storage device is accessible to the first host computer and to the second host computer.

19. The system of claim 15, wherein the management server is further configure to:
perform a method to extend a storage space of the first data storage device; and
detect that the method to extend the storage space of the first data storage device has failed.

20. The system of claim 15, wherein the management server is further configured to:
perform a method to add one or more storage extents to the first data storage device; and
detect that the method to add one or more storage extents to the first data storage device has failed.

21. The system of claim 15, wherein the management server is further configured to:
after allocating the second portion of the storage to the second data storage device, determine that the first storage device has sufficient free space to store the second portion of the storage; and
migrate the second portion of the storage from the second storage device to the first storage device.

* * * * *